US010462605B2

(12) United States Patent
Lynch et al.

(10) Patent No.: US 10,462,605 B2
(45) Date of Patent: Oct. 29, 2019

(54) METHOD, SYSTEM AND DEVICE FOR DETERMINING A SHARED JOURNEY

(71) Applicant: Faxi Limited, London (GB)

(72) Inventors: Tony Lynch, London (GB); Francois Planke, Evry (FR)

(*) Notice: Subject to any disclaimer, the term of this patent is extended or adjusted under 35 U.S.C. 154(b) by 0 days.

(21) Appl. No.: 16/118,464

(22) Filed: Aug. 31, 2018

(65) Prior Publication Data

US 2019/0075425 A1    Mar. 7, 2019

(30) Foreign Application Priority Data

Sep. 4, 2017   (GB) .................... 1714123.5

(51) Int. Cl.
*H04W 24/00*       (2009.01)
*H04W 4/02*        (2018.01)
(Continued)

(52) U.S. Cl.
CPC .......... *H04W 4/023* (2013.01); *H04W 4/021* (2013.01); *H04W 4/029* (2018.02); *H04W 4/06* (2013.01); *H04W 4/40* (2018.02); *H04W 12/12* (2013.01)

(58) Field of Classification Search
CPC ......... H04M 1/72572; H04M 2250/10; H04M 2242/30; H04M 3/42348; H04M 1/0202; H04M 1/72519; H04M 1/72525
(Continued)

(56) References Cited

U.S. PATENT DOCUMENTS 7,995,999 B2 *  8/2011  Smith ................. G06F 16/9537
                                                         455/414.3
8,340,648 B2 * 12/2012  Smith ................. G06F 16/9537
                                                         455/414.3
(Continued)

FOREIGN PATENT DOCUMENTS

GB       2533361 A      6/2016
GB       2536663 A      9/2016

OTHER PUBLICATIONS

United Kingdom Intellectual Property Office (UKIPO), GB1714123.5 Search Report, dated Feb. 22, 2018, 1 page, Newport, United Kingdom.
(Continued)

Primary Examiner — Joseph Arevalo
(74) Attorney, Agent, or Firm — Carmichael & Co.

(57) ABSTRACT

Provided is a computer implemented method of determining that two or more members of a subscription group shared a journey. The method comprises of determining that at least two members of a subscription group shared a journey from an origin to a destination over a period of time, the method comprising the steps of obtaining location and time data defining a first plurality of journey positions from the origin to the destination of a first mobile electronic device associated with a first member; segmenting the plurality of journey positions into a plurality of journey segments; forming an acceptable geographical-time zone around each journey segment; obtaining location and time data defining a second plurality of journey positions from the origin to the destination of a second mobile electronic device associated with a second member; and determining whether each second mobile electronic device journey position falls within the acceptable geographical-time zone around each journey
(Continued)

segment providing an indication the first and second mobile electronic devices shared a journey.

19 Claims, 6 Drawing Sheets

(51) Int. Cl.
*H04W 4/021* (2018.01)
*H04W 12/12* (2009.01)
*H04W 4/029* (2018.01)
*H04W 4/40* (2018.01)
*H04W 4/06* (2009.01)

(58) Field of Classification Search
USPC .... 455/456.3, 414.1, 456.6, 450, 519, 414.2
See application file for complete search history.

(56) References Cited

U.S. PATENT DOCUMENTS

| | | | | |
|---|---|---|---|---|
| 8,588,870 | B1 * | 11/2013 | Vargantwar | H04M 1/72572 |
| | | | | 455/574 |
| 8,660,583 | B2 * | 2/2014 | Smith | G06F 16/9537 |
| | | | | 455/456.3 |
| 2004/0158483 | A1 | 8/2004 | Lecouturier | |
| 2006/0058951 | A1 * | 3/2006 | Cooper | G01C 21/26 |
| | | | | 701/532 |
| 2006/0080031 | A1 * | 4/2006 | Cooper | G01C 21/32 |
| | | | | 701/532 |
| 2010/0201505 | A1 | 8/2010 | Honary et al. | |
| 2010/0262513 | A1 * | 10/2010 | Bonner | H04W 4/029 |
| | | | | 705/26.1 |
| 2013/0090136 | A1 * | 4/2013 | Smith | G06F 16/9537 |
| | | | | 455/456.3 |
| 2014/0122040 | A1 * | 5/2014 | Marti | G06F 17/5009 |
| | | | | 703/6 |
| 2014/0243020 | A1 | 8/2014 | Lerenc | |
| 2015/0149086 | A1 | 5/2015 | Alberth, Jr. | |
| 2016/0036777 | A1 * | 2/2016 | Bartlett | H04L 61/609 |
| | | | | 709/245 |
| 2016/0084936 | A1 * | 3/2016 | Smith | H04W 4/029 |
| | | | | 455/456.1 |
| 2017/0018184 | A1 * | 1/2017 | Northrup | G08G 1/144 |
| 2018/0122155 | A1 * | 5/2018 | Barreira Avegliano | |
| | | | | G07B 15/06 |
| 2018/0180434 | A1 * | 6/2018 | Schelhaas | G01C 21/362 |

OTHER PUBLICATIONS

European Patent Office (EPO), EP18191904 European Search Report, dated Jan. 18, 2019, 2 pages, Munich, Germany.

* cited by examiner

METHOD, SYSTEM AND DEVICE FOR DETERMINING A SHARED JOURNEY

FIELD OF THE INVENTION

The invention relates to a method, system and device for determining and verifying a shared journey of at least two mobile electronic units and, more particularly, but not exclusively to a method, system and device for verifying a shared journey over a period of time of at least two members of a subscription group where each member has an associated mobile electronic unit.

BACKGROUND OF THE INVENTION

Businesses, schools, hospitals, business districts, shopping centres, towns and whole cities are increasingly experiencing issues with vehicle congestion and parking. Some businesses have identified that some of their employees are spending up to an hour each morning attempting to find a parking space, with some employees being forced by lack of easy access to parking facilities to park so far from their place of work that they then need to take an additional bus journey to reach their place of employment. Public utilities such as hospitals and schools have reported that, come the morning rush hour, access to their premises often becomes blocked as large local traffic volumes reduces access to and from their parking areas. In many cases, the schools and hospitals have been forced to employ traffic marshals at the peak morning and afternoon traffic times in order to control the traffic and avoid traffic gridlock and other traffic related problems.

This has far reaching financial and human effects, both for the locus of these regular journeys and those undertaking the journeys, such as lost productivity, increased or additional costs to employers, schools, local authorities, etc., increased cost of transport for commuters, loss of quality of life and reduced safety.

Two of the key factors identified by employers and schools across the country as being able to help alleviate this issue are modal change and vehicle sharing. This includes encouraging people to walk, to cycle or to use public transport and, for those who still need to drive, to encourage multiple occupancy of vehicles, e.g. car sharing.

One of the key issues identified so far as retarding the promotion of car sharing schemes has been policing or authenticating the activity, i.e. proving that car sharing has or has not taken place. The lack of any easily implementable and secure schemes for verifying that car sharing has indeed taken place is currently a major factor in dissuading employer organisations from adopting and/or promoting car sharing schemes to their employees as alternatives to current travel habits. In the USA, where 'High Occupancy Vehicle' (HOV) lanes have been employed to promote car sharing for many years, commuters have been known to buy manikins to appear to be car sharing when they are not in fact doing so. This then forces transport authorities to invest in costly infra-red cameras to detect the presence, or absence, of another person in the vehicle other than the driver. Some existing schemes investigated in the UK use a system of passes that commuters display on the dashboard of the vehicle they travel in. However, as there is no easy way of uniquely tying a pass to a traveler at a time of travel, these are easily and frequently defrauded. Even when the parking authorities suspect that a vehicle is making use of a space reserved for car sharers without having been involved in a multiple occupancy journey there is little they can do to impose sanctions on the vehicle or its owner as there is no concrete evidence that no sharing took place.

Despite the current issues affecting the take up of car sharing schemes by both organisations and their employees, car sharing as an alternative to existing commuter transport mechanism is regarded very favourably by commuters as reducing the environmental impact of vehicle use, reducing congestion and reducing the costs of commuting. Consequently, it is envisaged that the provision of user friendly applications which enable commuters and their employers to implement car sharing would greatly promote the uptake of a car sharing scheme according to the invention.

OBJECTS OF THE INVENTION

An object of the invention is to mitigate or obviate to some degree one or more problems associated with known vehicle sharing schemes.

The above object is met by the combination of features of the main claims; the sub-claims disclose further advantageous embodiments of the invention.

Another object of the invention is to mitigate or obviate to some degree one or more problems associated with known high occupancy vehicle parking schemes.

Another object of the invention is to determine and verify a shared journey by a number of persons over a period of time to at least infer that they have shared the same vehicle of a journey.

One skilled in the art will derive from the following description other objects of the invention. Therefore, the foregoing statements of object are not exhaustive and serve merely to illustrate some of the many objects of the present invention.

SUMMARY OF THE INVENTION

The invention seeks to provide a method of determining a shared journey by two or more members of a subscription group. The method can be used to infer that the two or more members of the group are sharing the same vehicle for a journey. When one of the mobile electronic devices of the group members is detected as having reached a location on or within a boundary of a geo-fence associated with a particular destination, such as for example a carpark, data is communicated to a system or device of a third party associated with the carpark to alert the third party and/or provide the third party with data indicative of an identity of the vehicle and/or its driver to enable the driver to access car-parking spaces allocated to car share vehicles.

In a first main aspect, the invention provides a computer implemented method of determining that at least two members of a subscription group shared a journey from an origin to a destination over a period of time, the method comprising the steps of obtaining location and time data defining a first plurality of journey positions from the origin to the destination of a first mobile electronic device associated with a first member; segmenting the plurality of journey positions into a plurality of journey segments; forming an acceptable geographical-time zone around each journey segment; obtaining location and time data defining a second plurality of journey positions from the origin to the destination of a second mobile electronic device associated with a second member; determining whether each second mobile electronic device journey position falls within the acceptable geographical-time zone around each journey segment providing an indication the first and second mobile electronic devices shared a journey.

In a second main aspect, the invention provides a mobile electronic device for determining that at least two members of a subscription group shared a journey from an origin to a destination over a period of time, the device comprising: a memory storing machine readable instructions; a processor configured to execute said machine readable instructions to implement the steps of the method according to the first main aspect of the invention.

In a third main aspect, the invention provides a system for determining that two or more members of a subscription group shared a journey from an origin to a destination, the system comprising a server having a memory storing machine readable instructions and a processor configured to execute said machine readable instructions; a mobile electronic device having a memory storing machine readable instructions and a processor configured to execute said machine readable instructions; the server and the mobile electronic device being configured to communicate with each other over a network; wherein the server and the mobile device are configured to interoperate to implement the steps of the method according to the first main aspect of the invention.

In a fourth main aspect, the invention provides a computer readable medium storing machine readable instructions executable by a processor of a mobile electronic device for implementing the steps of the method according to the first main aspect of the invention.

In a fifth main aspect, the invention provides a computer readable medium storing machine readable instructions executable by a processor of a server for implementing the steps of the method according to the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
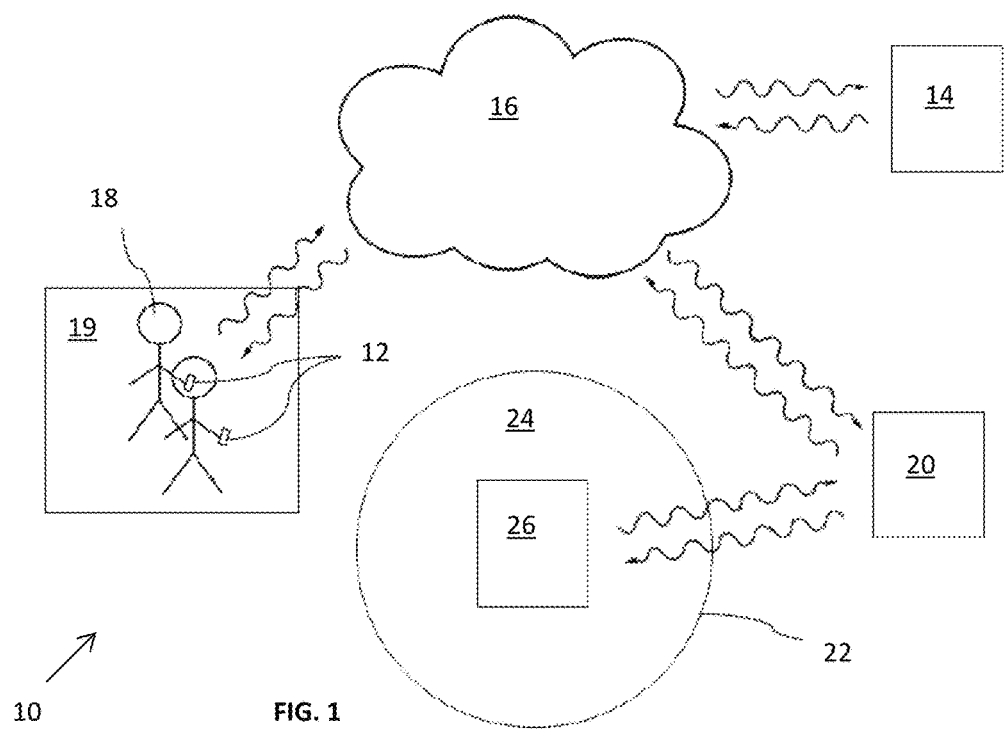
FIG. 1 is a schematic diagram of an example of a system according to the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figures, may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention aims to provide a system to determine the close proximity of previously identified users via their smart phones, other mobile internet connected devices, or mobile electronic devices for their participation, for example, in transport oriented incentive schemes, but the invention is not limited to determining close proximity of users for car sharing and parking purposes, but could be used for determining close proximity of previously identified users for any purpose. The invention involves the creation and provision of software in the form of mobile and server-side applications enabling multiple mobile operating systems that permit mobile devices to detect other devices to receive their unique identifiers and to provide other functionality, especially relating to sharing of scarce assets such as carparks. The mobile-side application can be downloaded to mobile electronic devices from the service provider server or by any other appropriate or known means.

Referring to the figures, the system 10 of the invention may comprise a number of user devices 12 and a system server 14 and may include a third party entity server 20. The user devices 12 may comprise handheld and/or mobile electronic devices such as smart phones, tablet computers or the like. Each of the user devices 12 may be capable of communicating with at least the system server 3 through a network such as a wireless communication network and/or the Internet 16, although this is not essential where the method of the invention is wholly carried out in one or more of the electronic devices 12 in which cases the devices 12 may be configured to connect directly through the network 16 to the third party entity server 20. In some embodiments, the system server 14 and the third party entity server 20 are hosted in one server device. Although, for clarity, only a small number of electronic devices 12 are shown in FIG. 1, it will be understood that, in practice, the system 10 may comprise a large number of electronic devices 12. FIG. 1 also shows users or members 18 that own or are associated with the user devices 12, and a vehicle 19 that the users 18 may occupy during a shared journey from an origin to a destination. The destination may be a carpark/asset 22 with a geo fence boundary 24 defining a geo-fence area 26.

Figure 2:
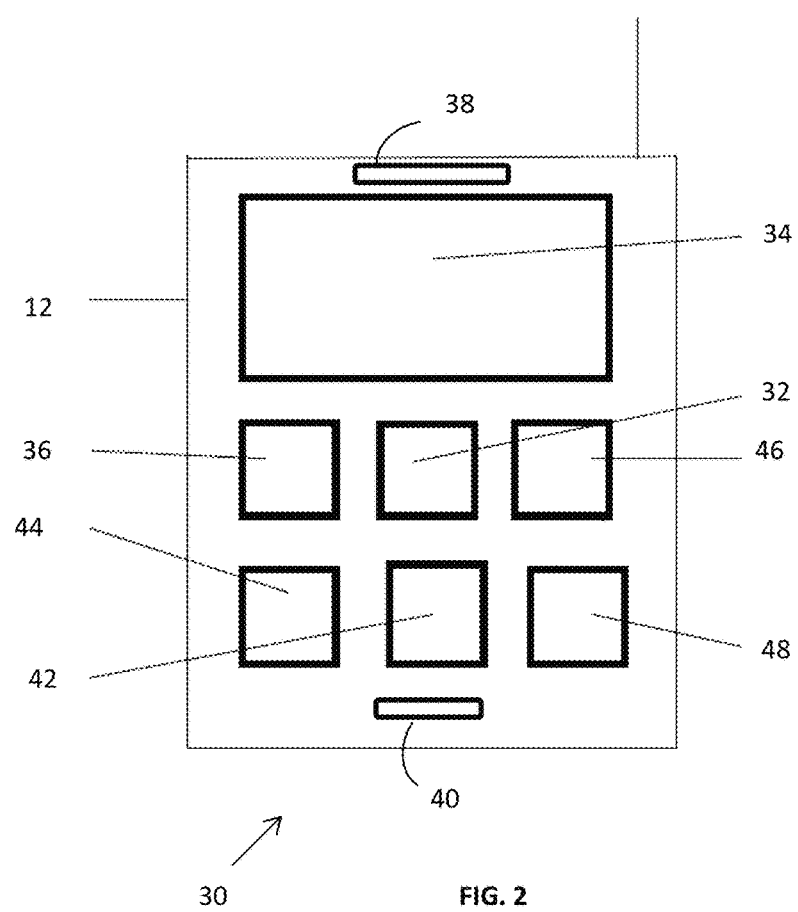
FIG. 2 is a schematic diagram of an example of a user device used in the system of FIG. 1 in accordance with an embodiment of the invention.

FIG. 2 illustrates an example of an electronic device 12 of the system 10 in more detail. As shown in FIG. 2, an electronic device 12 includes a data processor 32, a visual display 34, a user interface 36 allowing user instructions to be input to the device 12 and information to be presented and/or displayed to the user, a speaker 38 and a microphone 40. The various components of the electronic device 12 operate under the control of the processor 32 running machine code stored in a memory of the electronic device 12. The user interface 36 may be integrated with the visual display 34 as a touch screen display. In other examples the user interface 36 may be a dedicated keypad separate from the visual display or a combination of the two. The mobile electronic device 12 includes data communication module 42. Electronic devices including these components are well known to the skilled person, so these need not be described in detail here.

Further, the electronic device 12 may comprise one or more of a location determining means 44, a mapping or navigation module 46, and a location identifying module 48. The navigation module 46 and location identifying module 48 may be arranged to receive position information from the location determining means 44. In the illustrated example the location determining means 48 is operable with a global positioning system such as the so-called GPS. In other examples different satellite based navigation systems may be used. The navigation module 46 and the location identifying module 48 may comprise dedicated hardware, or may comprise software programs or applications running on the processor 32 of the electronic device 12.

The location identifying module 48 may use the position information provided by the location determining means 44 to provide location based services to a user through suitable applications running on the electronic device 12. Such applications may be downloaded to the device from a network server or the like.

For clarity, the operation of the system 10 with an electronic device 12 will be discussed.

Generally speaking, a first electronic device 12 has downloaded thereon a mobile device application for enabling it to determine that two or more persons using respective mobile electronic devices 12 are in close proximity to each other to indicate whether they have shared a journey. The application may be downloaded from an application service provider hosted by the system server 14. More specifically, the downloaded application may enable the first mobile electronic device 12 to determine that two or more members of a subscription group are in close proximity to each other. The mobile application, when executing, may configure the mobile device 12 to be in a discoverable mode thereby negating the need for a group member to manually enable discoverable mode on their mobile device 12.

A subscription group can be considered as a group of persons or members of a service that are somehow associated with one another as an identifiable group of subscribers amongst all subscribers of the service. Members may comprise persons, vehicles, and the like that are associated with the subscription group. The service provider system such as system server 14 may associate the members, vehicles, or the like of a group through unique identifiers which may be allocated or belonging to their respective mobile electronic devices 12 or allocated to the members of the group and inputted to their respective mobile devices.

The method may be implemented by one of the mobile electronic devices 12, e.g. a 'first mobile electronic device' 12 for the ease of describing the method of an embodiment of the invention, or by two, more than two, or all of the group members' electronic devices 12. Where the application relates to car sharing, a group may be limited to a specified number of members, e.g. four for a normal car, or the limit on the number of members may be based on the model of the group vehicle. For illustrative purposes, the figures describe a shared journey between a driver and a passenger. It will also be appreciated that a mode of transport, such as a vehicle, truck, public transport, motorcycle, bicycle, or the like may have an associated mobile electronic unit, such that the shared journey is between at least one person and a vehicle or mode of transport for proof that person shared or made their journey via a particular mode of transport.

Figure 3:
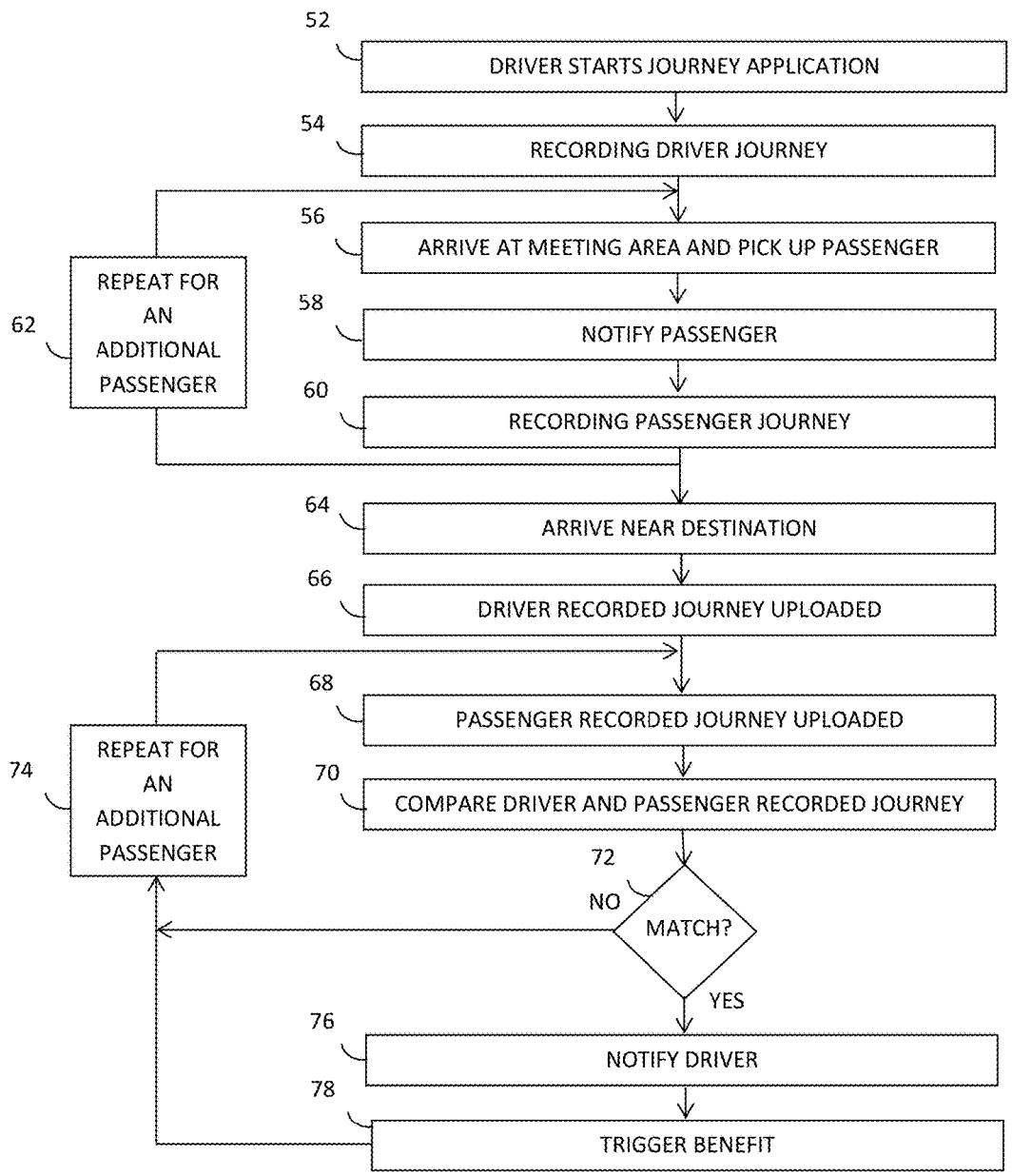
FIG. 3 shows a flow chart of a method for determining that two or more members in a subscription group shared a journey from an origin to a destination in accordance with an embodiment of the invention.

FIG. 3 shows a flow chart 50 of a method for determining that two or more members in a subscription group shared a journey from an origin to a destination in accordance with an embodiment of the invention. A driver, first member, starts a journey application 52 on the first mobile electronic device 12 of the first member at commencement of the journey in a vehicle 19. Once installed and running on the first mobile device, the mobile device records 54 time and location data defining journey positions of the driver journey. The driver arrives at meeting area and picks up 56 a passenger, i.e. second member. The second member has a second mobile electronic device with the journey application to record time and location data defining journey positions of the passenger journey. The journey application on each of the mobile electronic devices of the driver and the passenger records the journey data. The journey application is activated, terminated, and retrieved upon trigger events, points, zones, or the like such as entering a geofence at a location such as a passenger home, car park, or the like. A geofence is a predefined geographical zone around a place. The journey application records 64 the passengers' journey, and is repeated 66 for each additional passenger. When the vehicle arrives near the destination 68 within a geofence, the driver recorded journey is uploaded 70, and the passenger recorded journey is uploaded 72. The driver recorded journey and the passenger recorded journey are compared 74. If the passenger recorded journey matches then there is a positive result, and if the passenger journey does not match 76, then there is a negative result. This is repeated for each additional passenger 78. If there is a positive result for each passenger or at least one passenger, the driver is notified 80, and any benefit is triggered 82, such as access to a carpark, or the like.

Figure 4:
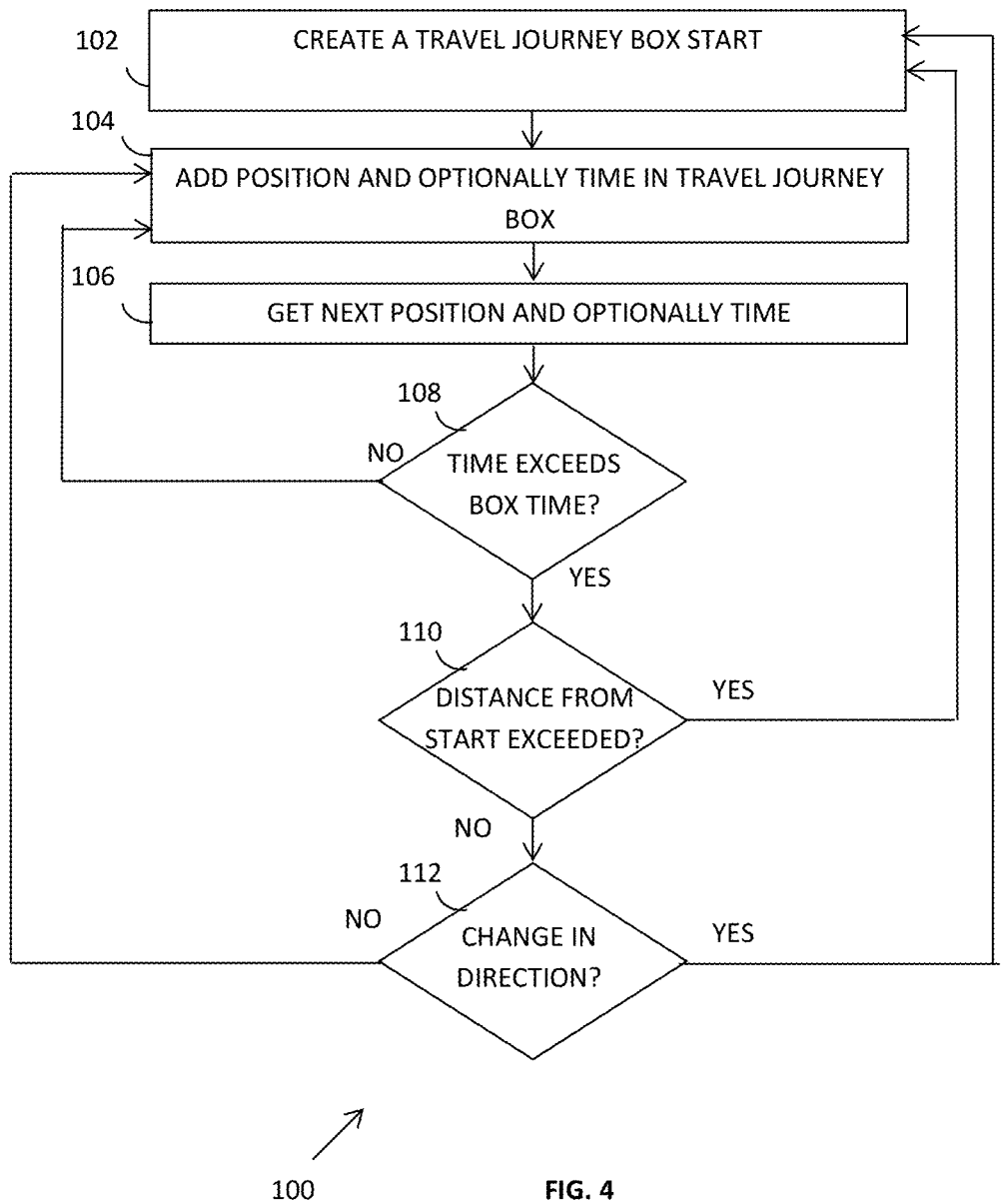
FIG. 4 is a flow chart of a method for segmenting journey segments and forming acceptable geographical-time zones, boxes, or the like in accordance with an embodiment of the invention.

FIG. 4 is a flow chart 100 of a method for segmenting journey segments and forming acceptable geographical-time zones or boxes in accordance with an embodiment of the invention. The location and time data representing driver journey positions is obtained from the driver recorded journey. A travel journey box is created 102 around the start journey position. The travel journey box may also be referred to as an area, zone, bucket, window, or the like that represents an acceptable geographical-time zone which surrounds the driver recorded journey positions. This acceptable geographical-time zone defines an acceptable margin of error due to system tolerances and accuracies to permit a positive result for a passenger shared journey when passenger recorded journey positions are plotted and compared to determine if they fall within the zone. Passenger recorded journey positions falling outside the acceptable geographical-time zone provides a negative result for that particular passenger recorded journey position. However, an overall positive result may be obtained if the majority of passenger journey recorded positions provide a positive result. This is discussed in more detail with reference to FIG. 5 below. Accordingly, after the first driver recorded journey position is added, the next driver recorded journey position is added 104 in the travel journey box and exit time of the box is extended, and the next position is received 106 and placement of the next position within the existing travel journey box or placement in a new next adjacent travel journey box is determined. To determine whether the next driver recorded journey position is in the existing travel journey box, or placement in a new next adjacent travel journey box, several conditions may be considered. The first consideration may be if the next position is too far away, or if the time exceeds the box time 108, or the like. Another consideration is if the distance from the previous recorded journey position or start recorded journey position exceeds a predetermined distance 110, and/or there is a selected or calculated change in direction 112. The direction of a box is the average direction of the points inside the box. In one embodiment, the angles between the direction of the vector formed by a next point and every of the 2 points forming the previous biggest angle is calculated. If the biggest of these 2 angles exceeds the previous biggest angle, then it is used to replace the previous biggest angle and the previous points, forming the set of points forming the biggest angle. If this new biggest angle does not exceed a predefined, i.e. selected or calculated, value, then said next point is added to the box and its time becomes the exit time of the box. If, however, the angle exceeds a predefined value, the next few following points (for example at least 3) are tested to verify if they are aligned in a new direction or if aligned with previous points. If aligned in a new direction, then said next point will be the first point of a new box and its time will be the entering time in this box, and the 2 following points are used to calculate the new biggest angle. If the following points are aligned with previous points, then the current, i.e. said next, point may be ignored and may be treated as an anomaly. In another more preferred embodiment, an angle between a direction formed by points already in the box and a next point not yet added to the box is determined. This is repeated in turn for each next point being considered to be added to the box. If the angle does not exceed a predefined value, then said next point is added to the box and its time becomes the exit time of the box. If, however, the angle does exceed the predefined value, the next point may be used to create a new box or the next few following points (for example at least 3) are tested to verify if they are aligned in a new direction or if aligned with previous points. If aligned in a new direction, then said next point will be the first point of a new box and its time will be the entering time in this box. If the following points are aligned with previous points, then the current, i.e. said next, point may be ignored and may be treated as an anomaly. In the same way, if the point is not consistent with a previous speed or if a direction change is not possible at the current speed, then the point may be discarded. The driver recorded journey positions are segmented accordingly and placed in acceptable contiguous geographical-time zones. A working example of this method is shown with reference to FIG. 6, and discussed in further detail below. At the end of this process there is provided a set of segments. It will be appreciated that the process discussed may be processed once no matter how many passengers are on board. It will be appreciated that the process easily determines which part of the driver/passenger journey is in common no matter when or where the journeys begin/end for each driver/passenger.

Figure 5:
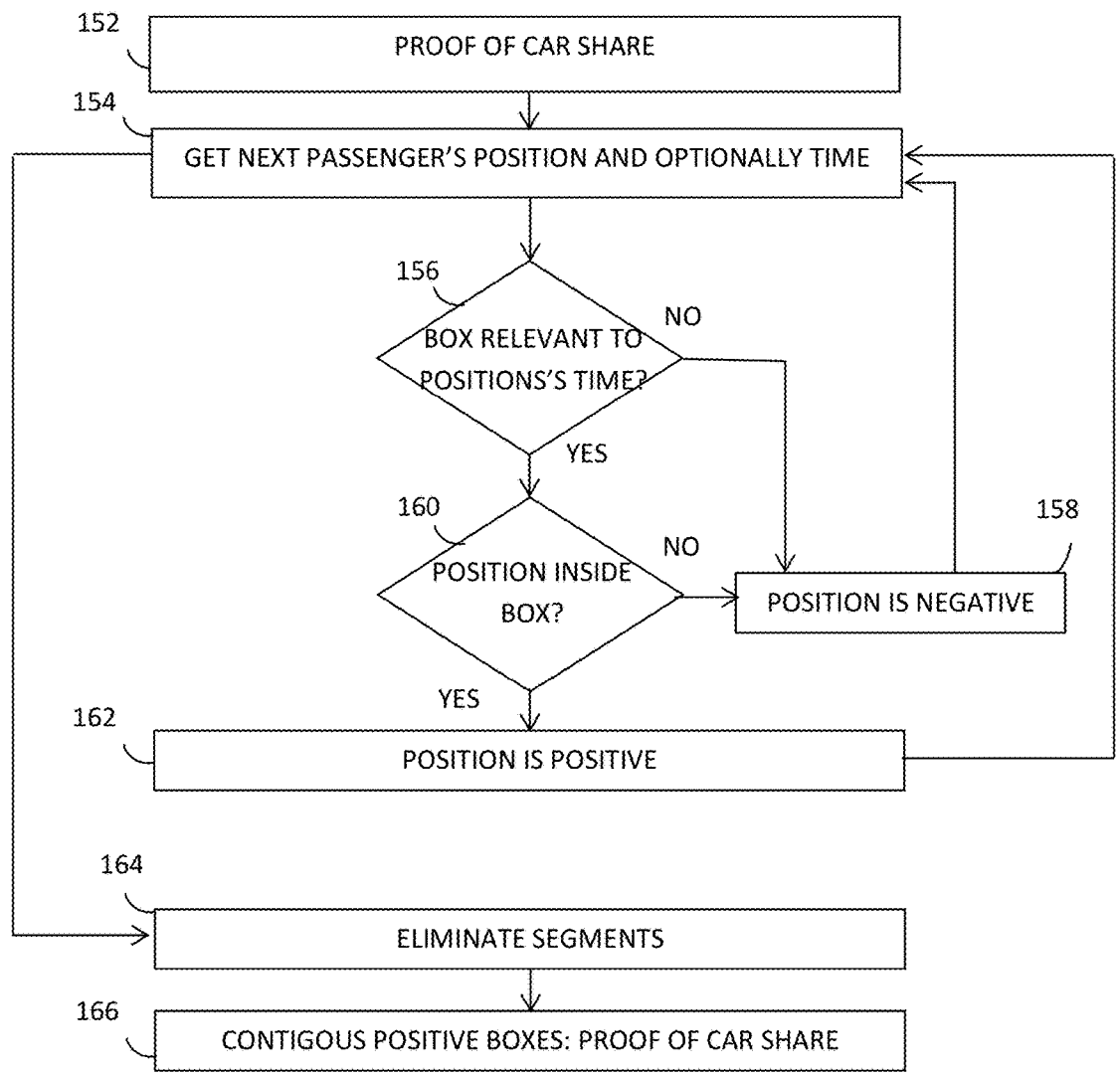
FIG. 5 is a flow chart of a method for verifying a shared journey in accordance with an embodiment of the invention.

FIG. 5 is a flow chart 150 of a method for verifying proof of a shared journey 152 in accordance with an embodiment of the invention. For each passenger record journey positions, the box or boxes that correspond to the time (i.e. which is between entering time and exiting time) are selected. Then passenger recorded journey position is checked 154, and determined if it falls within or outside of the zones or boxes. If the time of the position is not relevant 156 to the time of the box, or the position is outside the box 160, then the position is negative. If the time of the position is relevant to the box, and the position falls within the box, then the position is positive 162 and the count for this box is incremented. When the count of a box is higher than a predefined value, then this box is positive. When the percentage of positive boxes is higher than a predefined value, then the proof of car share is positive for this passenger. This is repeated for each passenger recorded journey position. Then the segments are eliminated 164, and the contiguous positive boxes show the proof of car share 166, where the contiguous positive boxes delimit the portion where the driver and the passenger(s) were together; this being the proof of car share. A working example of this method is shown with reference to FIG. 7, and discussed in further detail below.

Figure 6:
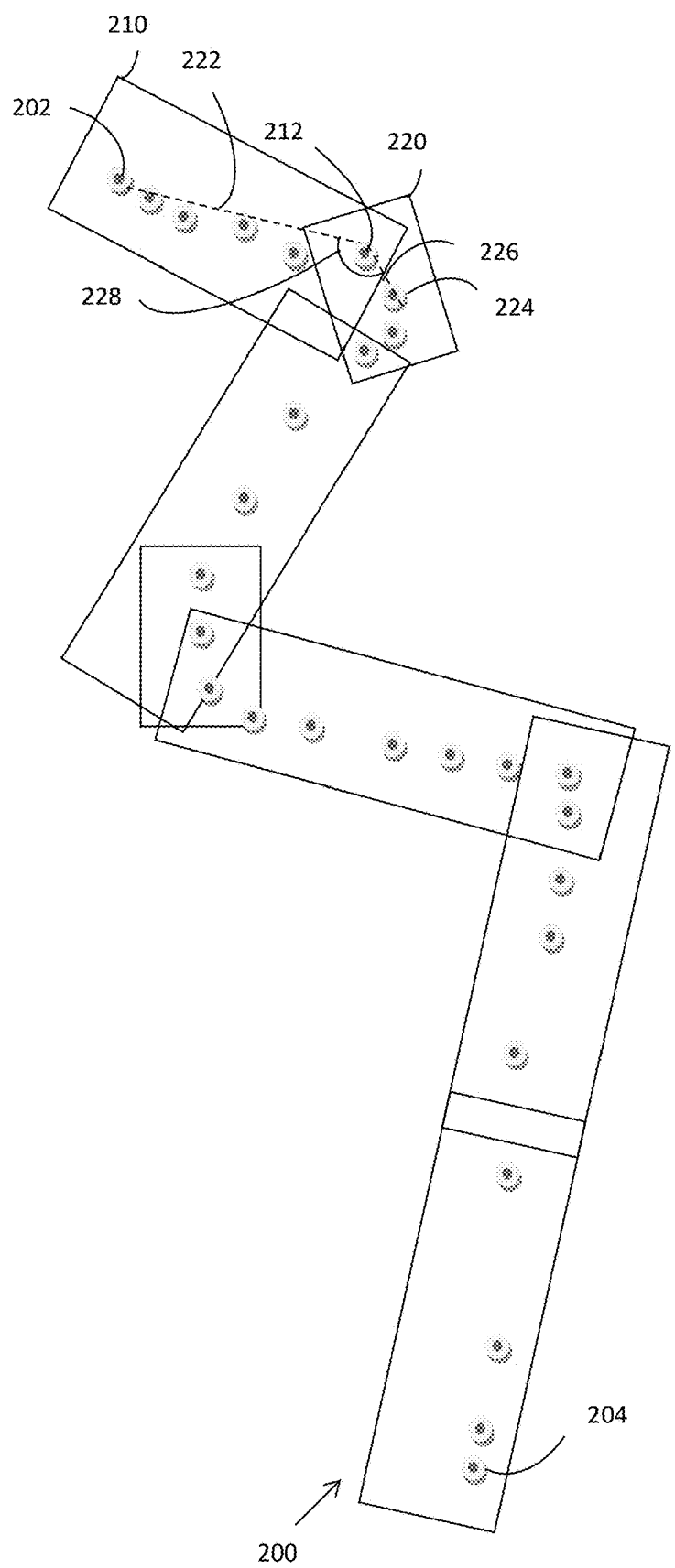
FIG. 6 is a diagram illustrating the method of FIG. 4 to process driver's data in accordance with an embodiment of the invention.

FIG. 6 is a diagram 200 illustrating the method of FIG. 4 to process driver's data in accordance with an embodiment of the invention. The driver's journey recorded positions obtained from the first mobile electronic device are plotted and the time and geographical boxes around the positions are formed. The overall journey is defined by the driver journey recorded positions starting from first start position 202 at the origin, to the last end position 204 at the destination. The positions are segmented into segments, and boxes are extended around each segment forming a series of contiguous boxes. The first box or first acceptable geographical-time zone 210 based on first journey segment extends to the sixth journey position 212. The second box or geographical-time zone 220 is contiguous with the first box 210 and contains the sixth journey position 212 as the first journey position. In this instance between the first box and second box, the journey direction changes to trigger formation of the second box 220. The direction change is observed by the angle formed by dashed line 222 extending from first start journey position to sixth journey position 212, and the dashed line 226 extending from the sixth position 212 to the seventh position 224. The angle between the dashed lines 222,226 is greater than 40 degrees, which, by way of example, is sufficient to trigger the formation of the second contiguous box 220. The remaining six contiguous boxes are triggered according to the different conditions described above such as change in direction, time, and/or distance.

Figure 7:
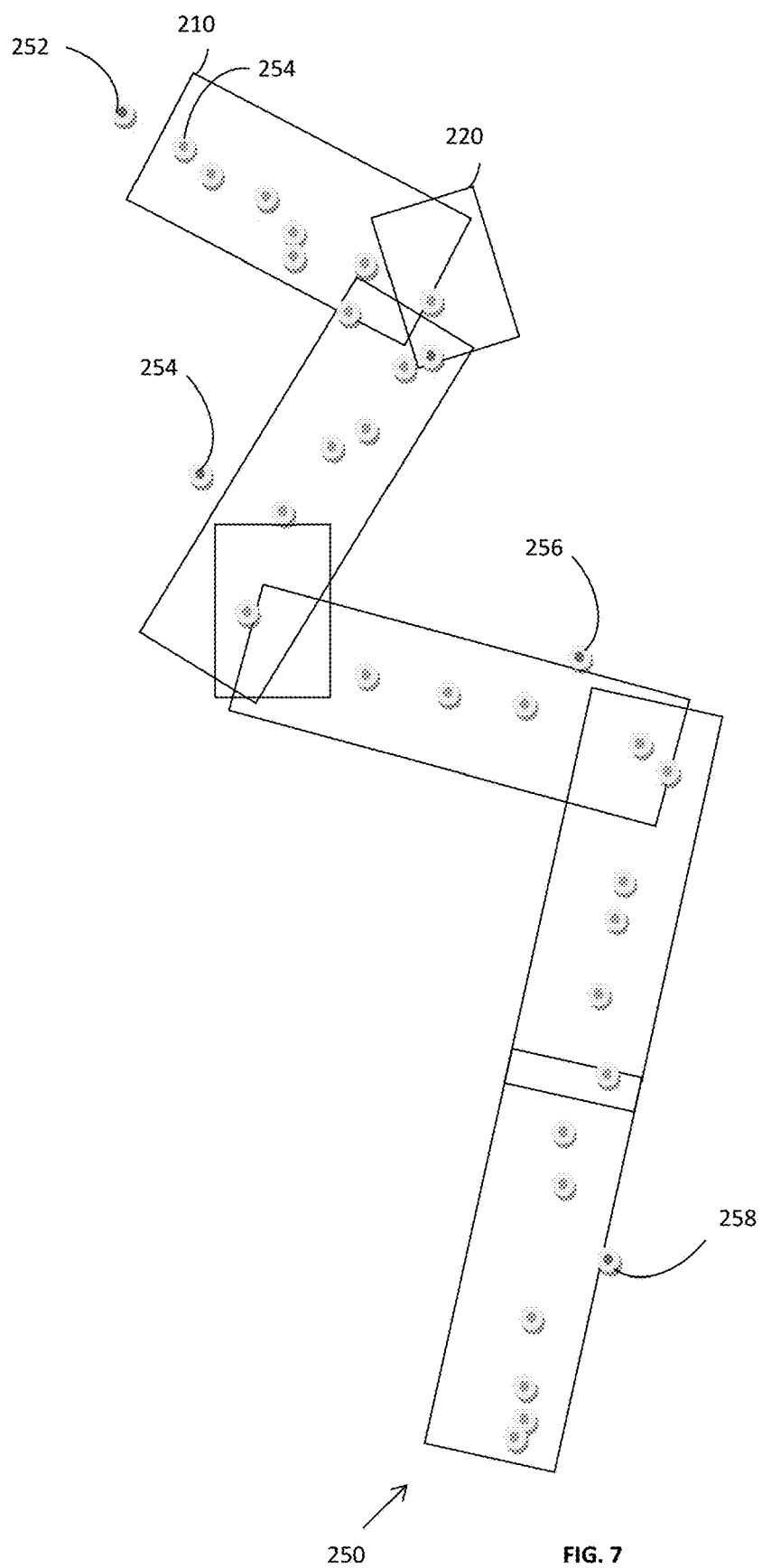
FIG. 7 is a diagram illustrating the method of FIG. 5 comparing passenger's data with driver's data in accordance with an embodiment of the invention.

FIG. 7 is a diagram 250 illustrating the method of FIG. 5 comparing passenger's data with driver's data in accordance with an embodiment of the invention. As described with reference to FIG. 6, driver's data is recorded and plotted as series of contiguous travel journey boxes that represents an acceptable geographical-time zone which surrounds the driver recorded journey positions. This acceptable geographical-time zone defines an acceptable margin of error due to system tolerances and accuracies to permit a positive result for a passenger shared journey when passenger recorded journey positions are plotted and compared to fall within the zone. Passenger recorded journey positions falling outside the acceptable geographical-time zone provides a negative result for that particular passenger recorded journey position. However, an overall positive result may still be obtained if the majority of passenger journey recorded positions provide a positive result. The first journey position 252 of the second mobile electronic device is outside of the first acceptable geographical-time zone of journey segment 210. Journey segment 210 contains 7 positive points and is therefore positive. Journey segment 220 contains only 1 positive point and is therefore negative. The fifteenth 254, twentieth 256, and twenty-ninth 258 journey positions of the passenger second mobile electronic device fall outside of first acceptable geographical-time zone of journey segment are also shown. Of the 7 boxes, only two are negative, and five boxes are positive. In this instance shown in FIG. 7 the rate of positive boxes is 71% which is greater than a predetermined rate of 66%, sufficient in this example for proving a shared journey.

This method can be used to infer that the two or more members of the group identified as being in close proximity with each other are sharing the same vehicle for a journey.

In an embodiment, a processor of the first mobile device 12 and/or another processor in the system or network such as a processor within system server 14, third party entity server 20, or the like may process any or all of the steps of the methods of the invention.

In one embodiment, the mobile device, i.e. mobile side, application configures each mobile device to communicate the location and time data at different points along the journey, upon reaching the destination, or the like, can receive such signals and, by consequence, the unique identifiers of the mobile devices within signal range. The mobile application may configure the mobile devices to issue the identification signal periodically. Furthermore, the format of the identification signal may be proprietary to the application, such that, other nearby devices not running the application do not become involved in the detection process. This also provides a higher level of security to the method of the invention in that it reduces the chances of the proprietary identification signal being spoofed.

When one of the mobile electronic devices 12 is detected as having reached a location on or within a boundary of a geo-fence associated with a carpark, data is communicated to a system or device 20 of a third party associated with the carpark to alert the third party and/or provide the third party with data indicative of an identity of the vehicle and/or its driver to enable the driver to access car-parking spaces allocated to car share vehicles.

In one embodiment, each scanning mobile electronic device 12 communicates with the server 14 or one or more of the detected other mobile electronic devices 12 via any one or any combination of: the short range wireless communication module 42; the wireless communication network 16; the internet 16, or the like.

The present invention seeks to provide a method, system and a device by which the approximate proximity of users to other users may be recorded over time by means of their associated smart phone, or other associated network/internet connected mobile electronic devices when making their way towards a destination such as a third party asset such as a car park while recording journey geolocation positions from the start point or origin and/or an end point or destination. Location and time data from the user's smart phones or connected devices 12 are transmitted to the server 14. The data is compared for the first user, such as a driver, with a second user, such as a passenger, to confirm, or at least infer, that the first user undertook a shared journey with at least one other user, and/or the first user undertook a shared journey via a particular mode of transport. Information indicative of the result of the comparison may be communicated through a network, internet, wireless network, or the like to a third party to, for example, apportion rewards or issue penalties.

In an embodiment, the locations of users may be recorded over time by means of their associated smart phone, or other associated network/internet connected geo-location enabled devices when making their way towards a third party asset such as a car park. An embodiment involves passing location and time data from users' smart phones or connected devices to the server 14 and comparing this data for a first user with similar data from other users to confirm, or at least infer, that the first user undertook a journey with at least one other user, i.e. they journey shared. Information indicative of the result of the comparison can then be communicated, through the internet or a wireless radio network, to a third party to apportion rewards or issue penalties.

In an embodiment a computer based method of proving two or more objects, by means of their associated smart phones or internet connected electronic devices, traveled together to a given, common destination. The method comprises of obtaining location and time data from said electronic devices. This information may be stored on the devices and uploaded to server 14 at a specified time, such as the crossing of a geo-fence, at a time convenient to the devices, i.e. when signal strength is sufficient, or the like, and comparing this location/time data for the users via a method of 'route finger-printing' and confirming a shared journey; passing such information to a third party asset management agency in a format and at a time appropriate for that agency to waive any fees, grant access to any asset or grant any reward as has been arranged.

In an embodiment a method provides by which two or more, potentially, large sets of data can be quickly and efficiently compared to prove, or at least infer, congruence. In order to be able to run many of these computations simultaneously and provide a smooth, seamless experience to users it is important that each calculation does not take up undue process resource.

In a specific embodiment, following installation and setting up of a mobile device application provided by the application service provider, the method of the invention may comprise the following initial steps at the user's mobile device 2:

1. The user logs in;
2. In response, the mobile device application receives from the server 14 a list of users in the same group(s) with their associated addresses (unique identifiers); and
3. Optionally, the mobile device application receives and registers the geofence of the target third party asset, e.g. carpark.

For a shared vehicle journey, the method may comprise the steps of:
1. The driver opens or invokes the mobile device application on his mobile device 12 and indicates a start of a journey or, optionally, the driver is notified by the server side application that it is time to pick up his/her passenger(s). The driver may subscribe to receive this type of notification from the server side application. The driver may be notified that it is time to pick up passengers, and the application informs the server of their position;
2. The passenger launches the mobile device application, and the application informs the server 14 of their position to start a handshake phase.
3. Optionally, the driver may select appropriate passenger(s) from a list provided by the server 14 or request the passengers to launch their mobile device applications for the service and attempt to connect with them again. The application may receive from server platform a list of passengers registered with the same group as the driver currently in the proximity or vicinity of the driver. This triggers a creation of a journey with time of the event on the server 14 platform;
4. Optionally also, each passenger is notified on his mobile device 12 that the server 14 has connected with them and they should confirm the journey has indeed begun and the journey is triggered, and the driver and/or passenger(s) will receive a journey ID in response and store the time of the response. A journey with a time event is created on the server platform;
5. Optionally also, the driver can add additional passengers along the route with the same procedure (steps 3-4.), or the driver may ask the passengers to launch the application on their electronic mobile device, and the user may be notified;
6. Optionally, the driver and/or passenger(s) may then confirm the journey has begun;
7. The driver may add additional passengers following the same procedure as steps 3-6;
8. Once a journey is started, each user's respective applications on mobile device 12, and/or server 14 will check and record periodically, e.g. every X seconds, or minutes, the location data, for example latitude and latitude and time elapsed since the journey origin was triggered in step 4;
9. Optionally, the recorded data sets are sent to the server at a predetermined rate, such as continuous, regular basis, intermittently, or the like. The data sets are sent often enough to provide reasonable proof of car sharing. In an embodiment the data is sent to limit battery consumption to maintain battery power of the user devices
10. When the driver's and passengers' user devices enter into the car park geofence, the recorded data are uploaded to the server 14 and/or to a third party server 20.

In an embodiment, the server 14 and/or the third party server 20 analyses the transmitted data records and apply a metric to verify if the recorded journey data are matching, i.e. confirm that the driver's mobile device 12 and passenger's mobile device 12 have remained in close proximity during the duration of the journey or a major part of it sufficient to afford access to a reserved parking space for HOVs, for example. The metric may not require that devices are determined as being in close proximity for 100% of the periodic scans, but that they are determined as being in close proximity for greater than a threshold number of he periodic scans. The metric may also require that the devices are determined as being in close proximity for at least a last one of the periodic scans. If a positive decision is obtained, it will amount to a proof of car share that the third party asset management agency requires to provide access to a reserved pool of places and/or apply a discounted rate. The foregoing example methodology for proof of journey sharing, suitably adapted, is applicable to providing access to other scarce assets controlled by third party systems or provide any other kind of incentive related to the number of passengers transported, the carbon saved, the total kilometers or to parking related costs saved, or the like.

In an embodiment, the device records the data sets during the journey, transmit to the server when approaching to the destination and the server analyzes and compare the data sets to determine if the driver and passenger(s) shared a journey. Each point of the driver's data set may be grouped into segments of time, i.e. "time buckets". Multiple buckets may be created along a route journey. In one embodiment each time bucket is the same length, dT. In segmenting the journey, a line between the first and last point in each time bucket or segment is calculated perpendicular to the centre line, and through these points to create a box around the time bucket segment, dT. If, on analysis, it is found that the set of points contained within any given bucket appears to head in a different direction such that it deviates from the centre line, such that the next points would be outside the bucket, then a new, bucket is created with a new centre line. At the end of the segmenting phase, there may be a series of time bucket segments, where each time segment has a start time and an end time, and a corridor. The corridor may be a geographical zone, usually rectangular, that contains all the points within a timeframe of the segment. For each passenger, each recorded journey point is associated with the driver segments or buckets. If this point of the passenger falls within the segment time bucket of the driver journey points, then a positive result is achieved. If this point of the passenger falls outside the segment time bucket of the driver journey points, then a negative result is achieved. When all the points have been processed, there will be a set of segments, each have a number of positives and/or negatives. A positive proof is given when enough contiguous buckets are positive on the correct part of the journey.

In the method of the invention, it is preferred that location and time data are obtained for the start of a journey or at least at a point where a first passenger joins the driver in the vehicle and towards the end of the journey when the vehicle reaches or crosses the designated third part asset geofence and/or the journey scan data are uploaded to the system server 14 and/or the third party server 20. However, the method may include obtaining time and location data for other points in the journey.

For example, the method may include the step of obtaining location and time data for said mobile electronic device 12 continuously, but such data is preferably gathered periodically and may only be gathered in response to trigger events such as when the device 12 is determined as having reached or crossed into one or more geo-fenced areas or regions.

Once the mobile device 12 is determined to have reached a point on the boundary or crossed said boundary to be located within the geo-fenced area of the carpark, the device 12 itself or, more preferably, the system server 14 communicates to a system or device such as the server 20 of the third party entity associated with the carpark (and the geo-fence around it) to alert said third party entity that the user/vehicle wishes to access the carpark. It will be understood that the size of the geo-fence boundary may be considerably larger than the asset it surrounds and that the size may be chosen to allow time for a user device 12 to be detected within the geo-fenced area and for alert messages to be sent from the system server 14 to the third party entity server 20. The geo-fence may surround more than one asset.

The advance information or data provided to the third party carpark entity server 20 may comprise a vehicle registration number, an identity of the vehicle driver or any other information that enables the cap park entity system to identify that the user's vehicle is entitled to take advantage of the priority services. The use of the vehicle registration plate as the advance data communicated to the server 20 of the carpark entity may be advantageous in that it can be automatically read using a registration plate recognition system and thus may enable the user of the vehicle to automatically access the priority services without the intervention of a carpark employee.

Issues of fraudulent use of the system of the invention may arise where a vehicle user registers two mobile devices with the server 14 of the system and then carries both within his vehicle. To address such concerns, the system may be configured to continue to obtain proximity data for the mobile devices 12 for a predetermined period after the advance data has been communicated to the carpark entity server 20. This predetermined period of time may be triggered later by a message from the carpark entity server 20 to the system server 14 indicating that the vehicle has entered the carpark. The further comparison of proximity data may reveal that the devices 12 remain in close proximity and are thus being held by one user. In the event that it is detected that the proximity of the mobile devices 12 is such that they are no longer close, it may be inferred that they are held by different users and that the vehicle was indeed occupied by multiple occupants. To further enhance security and to prevent or deter fraud, the users of the devices 12 may be required to enter biometric data such as a fingerprint using a fingerprint scanning application on their device 12 at any point during the process, but more particularly during an initial period prior to initiation of a tracking procedure and/or during a termination or predetermined period following parking. Other types of biometric data may be utilized such as voice recognition or iris recognition. Other forms of identification may be utilized such as a user's financial authority, e.g. contract phone/tablet connection bill, or because the device 12 was issued to them by their employer.

It will be appreciated that the location and time data obtained by the system server 14 for the mobile devices 12 may be utilized to determine other characteristics of the movements and locations of the devices 12 including distance of travel.

In one embodiment, the system is enhanced to provide means for proving that a device 12 is currently in the presence of the authorised user/owner whilst a journey share is being claimed to be taking place. This may be achieved by configuring the system server 14 to send requests challenging users for any one or more of: sensitive or security information known only to them, perform a specific action on their device 12; or telephoning the device or telephoning all the devices claimed to be part of the current journey share.

In general, the invention is concerned with a computer implemented method of determining that two or more members of a subscription group are in close proximity to each other during a journey. The method comprises the steps of enabling a server to track the journey positions of at least two mobile electronic devices of members of the subscription group and compare a first set of journey positions of the first user, i.e. driver, with other sets of journey positions of other users, i.e. passengers, from the origin to the destination with the wireless communication signal. In response to comparing, the server receives and stores a unique identifier for each detected mobile electronic device. A processor compares each stored unique identifier with known unique identifiers of mobile electronic devices of members of said subscription group. As a consequence of the comparing step, the processor determines that two or more members of the subscription group are in close proximity to each other if at least one of the stored unique identifiers matches one of the known unique identifiers of mobile electronic devices of members of the subscription group. This method can be used to infer that the two or more members of the group are sharing the same vehicle for a journey. When one of the mobile electronic devices is detected as having reached a location on or within a boundary of a geo-fence associated with a carpark, data is communicated to a system or device of a third party associated with the carpark to alert the third party and/or provide the third party with data indicative of an identity of the vehicle and/or its driver to enable the driver to access car-parking spaces allocated to car share vehicles.

Accordingly, embodiments of the invention provide a solution that gives strong proof that two or more users from a defined subscription group did effectively travel together. This proof consists of being able to provide evidence that the driver and passenger(s) were in the same proximity, at the same time, for the duration of their shared journey. An embodiment is efficient in terms of processing power in comparing all or selected data points for one user with all or selected data points with another user, in separation against time. An embodiment is tolerant and robust in the sense of system limitations such as geolocation hazards for example wrong coordinates through poor signal strength and the like. An embodiment is flexible such that on the parts of the journey shared in common are detected.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

What is claimed is:

1. A computer implemented method of determining that at least two members of a subscription group shared a journey from an origin to a destination over a period of time, the method comprising the steps of:
obtaining location and time data defining a first plurality of journey positions from the origin to the destination of a first mobile electronic device associated with a first member;
segmenting the plurality of journey positions into a plurality of journey segments;
forming an acceptable geographical-time zone around each journey segment;
obtaining location and time data defining a second plurality of journey positions from the origin to the destination of a second mobile electronic device associated with a second member; determining whether each second mobile electronic device journey position falls within the acceptable geographical-time zone around each journey segment to determine a positive result or a negative result for each acceptable geographical-time zone;
a driver recorded the journey and a passenger recorded journey are compared, If the passenger recorded journey matches then there is a positive result, and if the passenger journey does not match, then there is a negative result;
determining a rate of positive results for said acceptable geographical-time zones to thereby provide an indication the first and second mobile electronic devices shared a journey when the rate of positive results for said acceptable geographical-time zones is greater than a predetermined rate.

2. The method of claim 1, wherein obtaining the location and time data of the first mobile electronic device is triggered upon the first mobile electronic device reaching the destination.

3. The method of claim 1, wherein obtaining the location and time data of the first mobile electronic device is triggered at predetermined times during the journey.

4. The method of claim 1, wherein obtaining the location and time data of the first mobile electronic device is triggered periodically during the journey.

5. The method of claim 1 wherein segmenting the plurality of journey positions comprises segmenting the plurality of journey positions into equal period of time segments.

6. The method of claim 1 wherein segmenting the plurality of journey positions comprises segmenting the plurality of journey positions for predetermine periods of time.

7. The method of claim 1 further comprising re-segmenting a journey segment into sub-segments where a journey position of the first mobile electronic device falls outside of the acceptable geographical-time zone of the journey segment; and forming an acceptable geographical-time zone around each journey sub-segment.

8. The method of claim 7 further comprising re-segmenting a journey segment into sub-segments when the change of direction is greater than 40 degrees.

9. The method of claim 1 wherein the first mobile electronic device is associated with an object; and the method further comprises enabling access to the object to a third party asset upon an indication of a shared journey.

10. The method of claim 1, wherein method is performed in a processor that forms part of the mobile electronic device and/or a server.

11. The method of claim 1 wherein forming an acceptable geographical-time zone around each journey segment comprises forming contiguous acceptable geographical-time zones.

12. The method of claim 1 wherein each of the members is a person member in the subscription group.

13. The method of claim 1 wherein a member is a person member in the subscription group, and another member is a transport vehicle.

14. The method of claim 13, wherein the transport vehicle is a car, truck, bicycle, or public transport.

15. The method of claim 1 wherein the location data obtained for the mobile electronic device comprises location data derived from a global positioning satellite system.

16. The method of claim 1, wherein the mobile electronic device is a mobile electronic communication device.

17. The method claim 1, wherein a subscription group comprises a group of two or persons who have signed up to a service provided by an application service provider.

18. A mobile electronic device for determining that at least two members of a subscription group shared a journey from an origin to a destination over a period of time, the device comprising: a memory storing machine readable instructions;
a processor configured to execute said machine readable instructions to implement the steps of:
obtaining location and time data defining a first plurality of journey positions from the origin to the destination of a first mobile electronic device associated with a first member; segmenting the plurality of journey positions into a plurality of journey segments;
forming an acceptable geographical-time zone around each journey segment;
obtaining location and time data defining a second plurality of journey positions from the origin to the destination of a second mobile electronic device associated with a second member;
determining whether each second mobile electronic device journey position falls within the acceptable geographical-time zone around each journey segment to determine a positive result or a negative result for each acceptable geographical-time zone;
a driver recorded the journey and a passenger recorded journey are compared, If the passenger recorded journey matches then there is a positive result, and if the passenger journey does not match, then there is a negative result;
determining a rate of positive results for said acceptable geographical-time zones to thereby provide an indication the first and second mobile electronic devices shared a journey when the rate of positive results for said acceptable geographical-time zones is greater than a predetermined rate.

19. A non-transitory computer readable medium storing machine readable instructions executable by a processor of an electronic device for implementing the steps of:
obtaining location and time data defining a first plurality of journey positions from the origin to the destination of a first mobile electronic device associated with a first member; segmenting the plurality of journey positions into a plurality of journey segments;
forming an acceptable geographical-time zone around each journey segment;

obtaining location and time data defining a second plurality of journey positions from the origin to the destination of a second mobile electronic device associated with a second member; determining whether each second mobile electronic device journey position falls within the acceptable geographical-time zone around each journey segment to determine a positive result or a negative result for each acceptable geographical-time zone;

a driver recorded the journey and a passenger recorded journey are compared, If the passenger recorded journey matches then there is a positive result, and if the passenger journey does not match, then there is a negative result;

determining a rate of positive results for said acceptable geographical-time zones to thereby provide an indication the first and second mobile electronic devices shared a journey when the rate of positive results for said acceptable geographical-time zones is greater than a predetermined rate.

* * * * *